United States Patent
Coronado et al.

(10) Patent No.: US 9,792,181 B2
(45) Date of Patent: Oct. 17, 2017

(54) POOL OF DEVICES PROVIDING OPERATING SYSTEM REDUNDANCY

(75) Inventors: Juan A. Coronado, Tucson, AZ (US); Lisa R. Martinez, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 12/710,116

(22) Filed: Feb. 22, 2010

(65) Prior Publication Data

US 2011/0208922 A1    Aug. 25, 2011

(51) Int. Cl.
*G06F 11/00* (2006.01)
*G06F 11/14* (2006.01)
*G06F 11/20* (2006.01)

(52) U.S. Cl.
CPC ...... *G06F 11/1438* (2013.01); *G06F 11/1482* (2013.01); *G06F 11/20* (2013.01)

(58) Field of Classification Search
None
See application file for complete search history.

(56) References Cited

U.S. PATENT DOCUMENTS

| | | | |
|---|---|---|---|
| 5,574,851 A * | 11/1996 | Rathunde | 714/6.32 |
| 5,666,511 A * | 9/1997 | Suganuma et al. | 711/114 |
| 5,790,773 A * | 8/1998 | DeKoning et al. | 714/6.22 |
| 5,930,817 A * | 7/1999 | Mizuno et al. | 711/114 |
| 6,826,711 B2 * | 11/2004 | Moulton et al. | 714/6.12 |
| 6,988,194 B2 | 1/2006 | Nunn et al. | |
| 7,093,120 B2 | 8/2006 | Keohane et al. | |
| 7,499,988 B2 | 3/2009 | Keohane et al. | |
| 2004/0236984 A1 * | 11/2004 | Yamasaki | 714/6 |
| 2007/0168690 A1 * | 7/2007 | Ross | 714/4 |
| 2007/0185934 A1 * | 8/2007 | Cannon et al. | 707/204 |
| 2007/0192466 A1 | 8/2007 | Nahum | |
| 2009/0307426 A1 * | 12/2009 | Galloway et al. | 711/114 |

FOREIGN PATENT DOCUMENTS

WO    2008049738 A1    5/2008

OTHER PUBLICATIONS

Brent Welch, "Integrated System Models for Reliable Petascale Storage Systems," ACM Digital Library, SuperComputing '07, Nov. 10-16, 2007, pp. 12-16.

* cited by examiner

*Primary Examiner* — David X Yi
*Assistant Examiner* — Craig Goldschmidt
(74) *Attorney, Agent, or Firm* — Griffiths & Seaton PLLC

(57) ABSTRACT

Systems, methods, and computer program products for providing operating system (O/S) redundancy in a computing system are provided. One system includes a host computing device, a plurality of memory devices, and a sub-loader coupled between the host computing device and the plurality of memory devices. Each memory device stores a respective O/S and the sub-loader is configured such that the plurality of memory devices appear transparent to the host computing device. One method includes designating, a first logical unit device as a primary logical unit device and subsequently determining that the first logical unit device is unresponsive. The designation is removed from the first logical unit device and a second logical unit device is designated as a new primary logical unit device. One computer program product includes instructions for performing the above method.

18 Claims, 2 Drawing Sheets

POOL OF DEVICES PROVIDING OPERATING SYSTEM REDUNDANCY

FIELD OF THE INVENTION

The present invention generally relates to computing systems, and more particularly relates to systems, methods, and computer program products including a pool of devices providing operating system redundancy in computing systems.

BACKGROUND OF THE INVENTION

Ensuring that a computing system continues to operate in the event that one or more components in the operating system becomes inoperative is critical to many industries. Currently, if a memory device becomes unreachable or inoperable (e.g., when an array fails resulting in a total loss of access to any volumes on that array) the operating system (O/S) image on the memory device may become corrupted and/or may halt the server, which may also halt the application(s) running on the server. Recovery in this situation typically requires installation of a new O/S, as well as, restoring the system image from a backup memory device. Such an installation and restoration process can be a time consuming and/or expensive from a resource perspective.

SUMMARY OF THE DESCRIBED EMBODIMENTS

In view of the discussion above, it is therefore desirable to provide systems, methods, and computer program products capable of substantially avoiding the above installation and restoration process. In other words, various embodiments define systems, methods, and computer program products for providing operating system (O/S) redundancy in a computing system. One system comprises a host computing device, a plurality of memory devices, and a sub-loader coupled between the host computing device and the plurality of memory devices. In this embodiment, each memory device stores a respective O/S and the sub-loader is configured such that the plurality of memory devices appear transparent to the host computing device. The sub-loader is further configured to designate a first logical unit device as a primary logical unit device, determine that the first logical unit device is unresponsive, remove the designation of primary logical unit device from the first logical unit device, and designate the second logical unit device as a new primary logical unit device after removal of the primary logical unit device designation from the first logical unit device.

One method for providing O/S redundancy in a computing system comprises a sub-loader designating a first logical unit device including a first O/S as the primary logical unit device. The method further comprises the sub-loader subsequently determining that the first logical unit device is unresponsive and removing the designation of primary logical unit device from the first logical unit device. Furthermore, the method comprises the sub-loader designating a second logical unit device including a second O/S that is a clone of the first O/S as a new primary logical unit device after removal of the primary logical unit device designation from the first logical unit device.

A computer program product in accordance with one embodiment comprises a first executable portion for designating a first logical unit device including a first O/S as a primary logical unit device. The computer program product further comprises a second executable portion for determining that the first logical unit device is unresponsive and a third executable portion for removing the designation of primary logical unit device from the first logical unit device. Furthermore, the computer program product comprises a fourth executable portion for designating a second logical unit device including a second O/S that is a clone of the first O/S as a new primary logical unit device after removal of the primary logical unit device designation from the first logical unit device.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the above background of the invention or the following detailed description of the invention.

Figure 1:
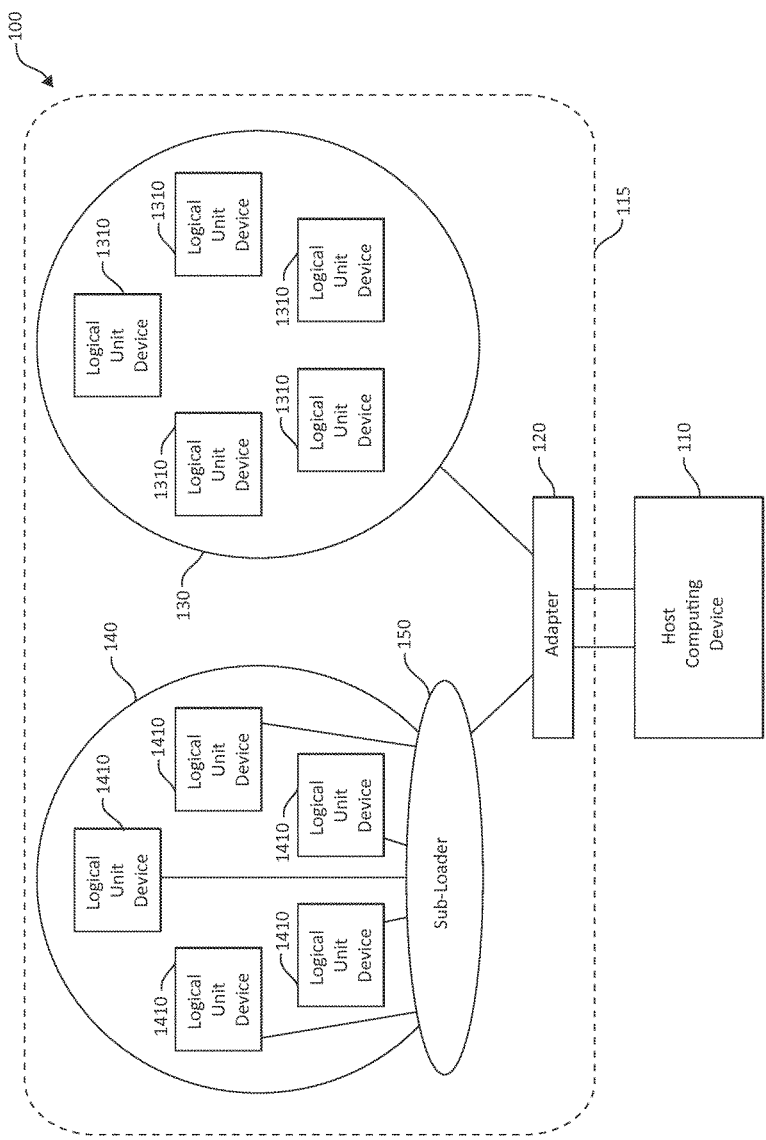
FIG. 1 is a block diagram of one embodiment of a computing system comprising operating system (O/S) redundancy.

Turning now to the figures, FIG. 1 is a block diagram of one embodiment of a system 100 comprising operating system (O/S) redundancy. At least in the illustrated embodiment, system 100 comprises a host computing device 110 coupled to a storage subsystem 115 via an adapter 120, which is coupled to a host volume group 130 and to a pool of memory devices 140 via a sub-loader 150. Specifically, the coupling between host computing device 110 and adapter 120, in various embodiments, may be a direct coupling, through a storage area network (SAN) coupling, or through any coupling known in the art or developed in the future.

Host computing device 110 may be any computing device known in the art of developed in the future capable of performing host functions. That is, host computing device 110 may be any open systems host capable of running any version of AIX®, any version of LINUX®, any version of UNIX®, any version of WINDOWS®, any version of a Mac® O/S, any version of Sun Solaris®, any version of HP-UX®, and/or the like operating systems. As illustrated in FIG. 1, adapter 120 is utilized to couple host computing device 110 to storage subsystem 115.

Adapter 120 may be any host bus adapter known in the art or developed in the future. In one embodiment, adapter 120 is a Fibre Channel adapter. In other embodiments, adapter 120 may be, for example, an SCSI adapter, an internet SCSI (iSCSI) adapter, a serial attached SCSI (SAS) adapter, or the like adapter. Adapter 120 enables host computing device 110 to perform input/output (I/O) operations with host volume group 130.

As illustrated in FIG. 1, host volume group 130 comprises one or more logical unit devices 1310, each logical unit device 1310 being identifiable by a unique logical unit number (LUN). Each logical unit device 1310 may be any type of memory device known in the art or developed in the future. In one embodiment, logical unit devices 1310 are memory disks arranged in any one of the redundant array of independent disks (RAID) configurations. That is, logical unit devices 1310 may be, for example, a small computer system interface (SCSI) disk drive, a Fibre Channel disk drive, a SATA disk drive, or a solid state disk drive, and/or the like memory disk devices. In another embodiment, logical unit devices 1310 are memory tape. Adapter 120 also enables host computing device 110 to communicate with pool of memory devices 140 via sub-loader 150.

Pool of memory devices 140 comprises one or more logical unit devices 1410, each logical unit device 1410 being identifiable by a unique LUN. In one embodiment, logical unit devices 1410 are each memory disks storing a respective O/S, which may be any open systems O/S known in the art or developed in the future. Examples of an O/S stored on each respective logical unit device include, but are not limited to, any version of AIX®, any version of LINUX®, any version of UNIX®, any version of WINDOWS®, any version of a Mac® O/S, any version of Sun Solaris®, any version of HP-UX®, and/or the like operating systems. The O/S stored on each logical unit device 1410 is capable of booting system 100 and performing other operating system functions.

Each O/S stored on each logical unit device 1410 is substantially identical. That is, logical unit devices 1410 are each substantial clones of one another. Specifically, as one O/S on a particular logical unit device 1410 is modified, the other operating system(s) on the other logical unit device(s) are also similarly modified. Furthermore, in the event that one or more new logical unit devices 1410, each including a respective O/S, is/are added to pool of memory devices 140, each respective O/S will be modified (either synchronously or asynchronously) such that each new O/S is a clone of each pre-existing O/S in pool of memory devices 140.

Each logical unit device 1410 may be a serial advanced technology attachment (SATA) device, an enterprise device, or a solid-state device. In one embodiment comprising more than one logical unit device 1410, each logical unit device is the same type of logical unit device (e.g., all SATA devices, all enterprise devices, or all solid-state devices). In another embodiment comprising more than one logical unit device 1410, at least two logical unit devices are different types of logical unit devices (e.g., at least one SATA device and at least one enterprise device, at least one SATA device and at least one solid-state device, or at least one enterprise device and at least one solid-state device). In yet another embodiment, each logical unit device is a different type of logical unit device (e.g., one SATA device and one enterprise device; one SATA device and one solid-state device; one enterprise device and one solid-state device; or one SATA device, one enterprise device, and one solid-state device).

One or more of logical unit devices 1410 may be arranged in any one of the RAID configurations (e.g., RAID 0, RAID 1, RAID 2, RAID 3, RAID 4, RAID 5, RAID 6, RAID 10, and RAID 01). In one embodiment comprising more than one logical unit device 1410 arranged in a RAID configuration, each of the RAID-configured logical unit devices includes the same RAID configuration. In another embodiment comprising more than one logical unit device 1410 arranged in a RAID configuration, at least two of the RAID-configured logical unit devices include the same RAID configuration. In yet another embodiment comprising more than one logical unit device 1410 arranged in a RAID configuration, at least two of the RAID-configured logical unit devices include different RAID configurations, for a total of thirty-six combinations. The thirty-six combinations include: RAID 0/RAID 1, RAID 0/RAID 2, RAID 0/RAID 3, RAID 0/RAID 4, RAID 0/RAID 5, RAID 0/RAID 6, RAID 0/RAID 10, RAID 0/RAID 01, RAID 1/RAID 2, RAID 1/RAID 3, RAID 1/RAID 4, RAID 1/RAID 5, RAID 1/RAID 6, RAID 1/RAID 10, RAID 1/RAID 01, RAID 2/RAID 3, RAID 2/RAID 4, RAID 2/RAID 5, RAID 2/RAID 6, RAID 2/RAID 10, RAID 2/RAID 01, RAID 3/RAID 4, RAID 3/RAID 5, RAID 3/RAID 6, RAID 3/RAID 10, RAID 3/RAID 01, RAID 4/RAID 5, RAID 4/RAID 6, RAID 4/RAID 10, RAID 4/RAID 01, RAID 5/RAID 6, RAID 5/RAID 10, RAID 5/RAID 01, RAID 6/RAID 10, RAID 6/RAID 01, and RAID 10/RAID 01. In still another embodiment comprising more than one logical unit device 1410 arranged in a RAID configuration, each of the RAID-configured logical unit devices includes a different RAID configuration. In yet still another embodiment, at least one logical unit device 1410 is arranged in a RAID configuration and at least one logical unit device 1410 is not arranged in a RAID configuration. In a further embodiment, two or more logical unit devices 1410 are arranged in a RAID configuration and two or more logical unit devices 1410 are not arranged in a RAID configuration.

Sub-loader 150 is a memory device including a unique SCSI ID that is configured to manage a pool of memory devices 140. Sub-loader 150 is located between host computing device 110 and pool of memory devices 140 and is configured such that sub-loader 150 is the only memory device in pool of memory devices 140 that is "seen" by host computing device 110. That is, host computing device 110 "sees" sub-loader 150 as a single logical unit device that is the boot device and/or the memory device including the O/S.

Sub-loader 150 is configured to "choose" one of logical unit devices 1410 as a primary logical unit device. The primary logical unit device is the logical unit device 1410 that is serving as the actual boot device and/or includes the actual O/S that is being used in system 100. In one embodiment, sub-loader 150 autonomously chooses the primary logical unit device from among pool of memory devices 140. The selection of which logical unit device 1410 is to serve as the primary logical unit device may be done by random selection or may be based on the type of device (e.g., SATA device, enterprise device, and solid-state device), the RAID configuration (e.g., RAID 0, RAID 1, RAID 2, RAID 3, RAID 4, RAID 5, RAID 6, RAID 10, and RAID 01), a predetermined particular logical unit device 1410, or any other predetermined criteria or predetermined criterion for the logical unit device 1410. In another embodiment, the user is capable of instructing sub-loader 150 (e.g., via a graphical user interface (GUI) or command line interface (CLI)) which logical unit device 1410 will serve as the primary logical unit device.

In one embodiment, sub-loader 150 is configured to ensure that each O/S on each logical unit device 1410 is synchronized. Furthermore, sub-loader 150 is configured to synchronize each new logical unit device 1410 that is added to pool of memory devices 140 with the acting primary logical unit device such that all of the logical unit devices 1410 are substantial clones of one another. Moreover, sub-loader 150 is also configured to keep the secondary logical unit device(s) synchronized with the primary logical unit device as the O/S image on the primary logical unit device is modified by various user and/or non-user actions. It is the synchronization of each logical unit device 1410 with the acting primary logical unit device that enables all of the logical unit devices 1410 to be substantial clones of one another.

Sub-loader 150 is further configured to monitor logical unit devices 1410 to determine if logical unit devices 1410

(and particularly the primary logical unit device) are functioning properly. In the unlikely event that the primary logical unit device is not functioning properly, sub-loader 150 is configured to remove the primary designation from the original primary logical unit device 1410 and select a different one of the logical unit devices 1410 as the new primary logical unit device.

In one embodiment, selection of the new primary logical unit device is based on the type of device (e.g., SATA device, enterprise device, and solid-state device). Here, the new primary logical unit device may be the same type of device or a different type of device than the original primary logical unit device depending on the desired level of dependability. For example, if the original primary logical unit device is a SATA device and a greater level of dependability is desired, then the new primary logical unit device may be a solid-state device or an enterprise device. If the same level of dependability is desired, then the new primary logical unit device may be the same type of device as the original primary logical unit device.

In another embodiment, the selection of the new primary logical unit device is based on RAID configuration. That is, sub-loader 150 is configured to select a logical unit device 1410 as the new primary logical unit device depending on a desired new mirroring scheme or retaining the previous mirroring scheme. For example, if a new mirroring scheme is desired or is predetermined as a selection criterion or a portion of a selection criteria, then the new primary logical unit device will include a different RAID configuration than the original primary logical unit device. If, on the other hand, the same mirroring scheme is desired or is predetermined as a selection criterion or a portion of a selection criteria, then the new primary logical unit device will include the same RAID configuration than the original primary logical unit device.

In yet another embodiment, a predetermined particular logical unit device 1410 may be selected as the new primary logical unit device. Furthermore, any predetermined criteria or predetermined criterion may be utilized in selecting the new primary logical unit device.

Sub-loader 150, in one embodiment, is configured to maintain a table for each of logical unit devices 1410 that keeps track of the out-of-synch sectors on each respective logical unit device 1410 relative to the sectors on the primary logical unit device to ensure that all of the logical unit devices 1410 are clones of one another. To accomplish such, sub-loader 150 is configured to set a bit in each table indicating which sector(s) need to be synched when a response for input/output indicating that data is "hardened" on the primary logical unit device is received by sub-loader 150. Sub-loader 150 is further configured to implement a process (either synchronously or asynchronously) for ensuring that all of the logical unit devices 1410 are synchronized within a predetermined amount of time. Furthermore, sub-loader 150 is configured to reset the out-of-synch bitmap once each sector is cloned.

Notably, although the above embodiments reference the terms "original primary logical unit device" and "new primary logical unit device," which may infer that only two logical unit devices 1410 exist in pool of memory devices 140, one skilled in the art will recognize that the principles associated with the above embodiments applies to embodiments of system 100 including more than two logical unit devices 1410 in pool of memory devices 140. That is, the new primary logical unit device may, in theory, become the original primary logical unit device for the purposes of the above discussion in the unlikely event that the new primary logical unit device begins to not function properly and a second new primary logical unit device is needed to replace the first new primary logical unit device.

In the configuration illustrated in FIG. 1, because host computing device 110 only sees sub-loader 150, switching from the original primary logical unit device to the new primary logical unit device is transparent to host computing device 110. During operation of system 100 when host computing device 110 needs to boot or perform other O/S functions, sub-loader 150 receives a request to access the O/S from host computing device 110 and routes the request to the original primary logical unit device. To accomplish such, sub-loader 150 includes a table indicating which of the logical unit devices 1410 is the primary device. If the original primary logical unit device is unresponsive to the request for some maximum amount of time (e.g., a time less that the host time-out), sub-loader 150 transmits the request to the new primary logical unit device in accordance with one of the above-described embodiments. Sub-loader 150 will then attempt to bring the original primary logical unit device back in synch so that the original primary logical unit device is again available, or will notify the user that the original primary logical unit device is in need of repair/replacement. The above-described redundancy enables system 100 to remain substantially continually capable of being booted and/or remaining operational, which is beneficial in avoiding installation of a completely new O/S and/or restoring the system image from a backup memory device.

Figure 2:
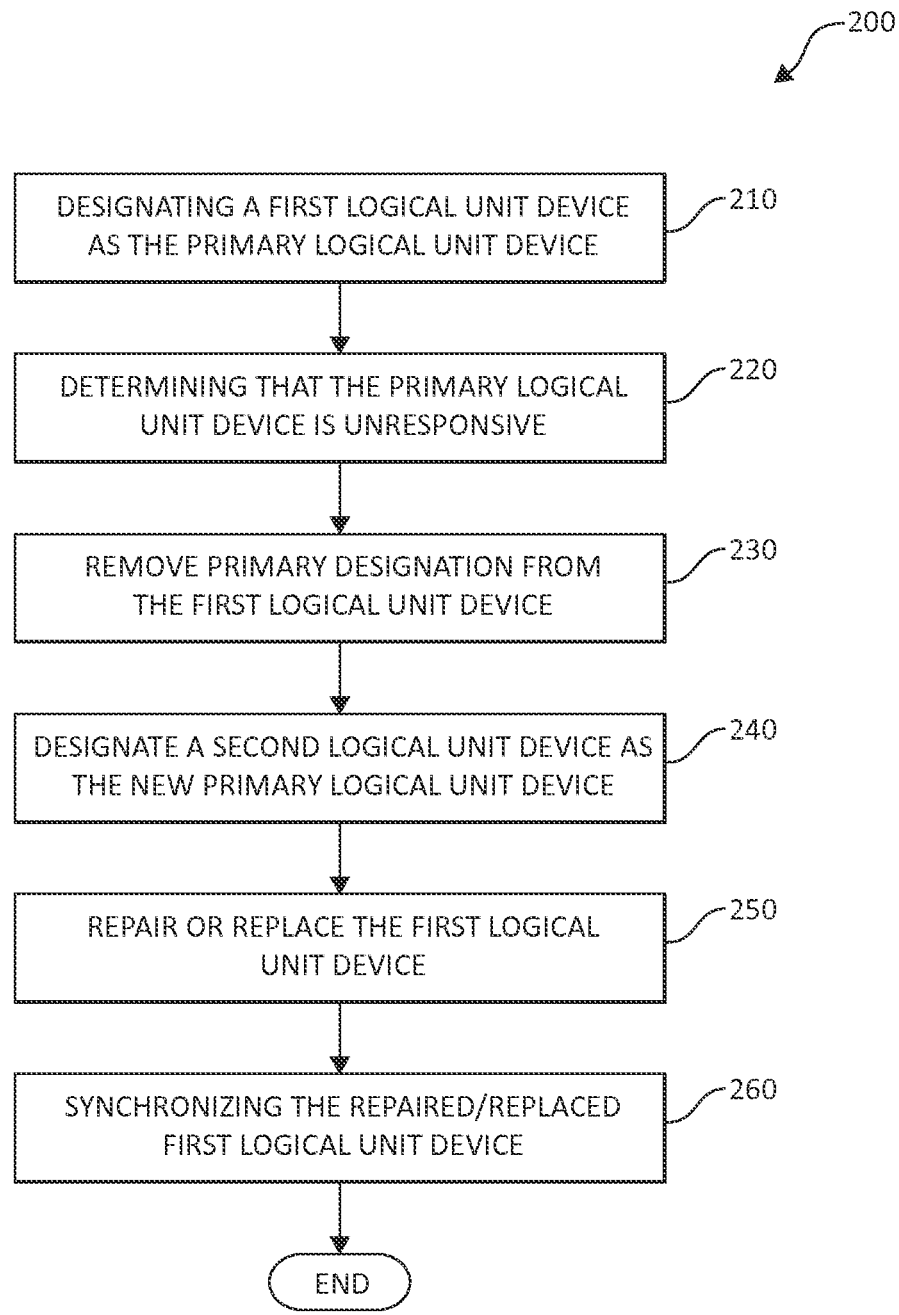
FIG. 2 is a flow diagram of one embodiment of a method for providing O/S redundancy in a computing system.

FIG. 2 is a flow diagram of one embodiment of a method 200 for providing O/S redundancy in a computing system (e.g., system 100). At least in the illustrated embodiment, method 200 initiates by a sub-loader (e.g., sub-loader 150) or a user designating a first logical unit device (e.g., logical unit device 1410) storing a first O/S as a primary logical unit device (block 210). Method 200 further comprises determining that the primary logical unit device is inoperable or unresponsive (block 220) and removing the designation of primary operating system from the first logical unit device (block 230). Furthermore, method 200 comprises designating a second logical unit device comprising a second O/S that is a clone of the first O/S as the new primary logical unit device for the computing system after removal of the primary logical unit device designation from the first logical unit device (block 240). Method 200 further comprises repairing or replacing the first logical unit device (block 250) and synchronizing the repaired or replaced first logical unit device (block 260).

In one embodiment, removing the primary logical unit device designation from the first logical unit device and designating the second logical unit device as the new primary logical unit device is transparent to the host computing device. That is, sub-loader 150 may be utilized to "hide" logical unit devices 1410 from host computing device 110.

Designating the first logical unit device as the primary logical unit device, in one embodiment, comprises designating the first logical unit device as the primary logical unit device based on a first type of memory device for the first logical unit device. The first type of memory device may be a serial advanced technology attachment (SATA) device, an enterprise device, or a solid-state device.

Designating the first logical unit device as the primary logical unit device, in another embodiment, comprises designating the first logical unit device as the primary logical unit device based on a first RAID configuration for the first logical unit device. The first type of RAID configuration may be RAID 0, RAID 1, RAID 2, RAID 3, RAID 4, RAID 5, RAID 6, RAID 10, or RAID 01.

Designating the second logical unit device as the new primary logical unit device, in one embodiment, comprises designating the second logical unit device as the new primary logical unit device based on a second type of memory device for the second logical unit device. The second type of memory device may be RAID 0, RAID 1, RAID 2, RAID 3, RAID 4, RAID 5, RAID 6, RAID 10, or RAID 01. In one embodiment, the first RAID configuration and the second RAID configuration are different types of RAID configurations such that the first logical unit device and the second logical unit device are mirrored differently. In another embodiment, the first RAID configuration and the second RAID configuration are the same RAID configuration.

Designating the second logical unit device as the new primary logical unit device, in another embodiment, comprises designating the second logical unit device as the new primary logical unit device based on a second RAID configuration for the second logical unit device. The second RAID configuration may be a SATA device, an enterprise device, or a solid-state device. In one embodiment, the first type of memory device and the second type of memory device are different types of memory devices such that the first logical unit device and the second logical unit device are different device types. In another embodiment, the first type of memory device and the second type of memory device are the same type of memory device.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program or data for use by or in connection with an instruction execution system, apparatus, or device.

Program code embodied on a computer readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system providing operating system redundancy, comprising:
   a host computing device;
   a plurality of physical memory devices, each memory device storing a respective operating system; and
   a sub-loader coupled between the host computing device and the plurality of physical memory devices such that the host computing device sees the plurality of physical memory devices and the sub-loader as a single memory device, wherein the sub-loader is configured to:
      comprise a memory device connected to one of the plurality of physical memory devices to present the plurality of physical memory devices to the host computing device as a single memory device,
      designate a first logical unit device as a primary logical unit device comprising a first physical memory disk and storing a first respective operating system, the first logical unit device being a first type of memory device having a first mirroring scheme;
      determine that the first logical unit device is unresponsive pursuant to failing to receive a response to perform a functional request after a predetermined threshold of time,
      remove the designation of primary logical unit device from the first logical unit device,
      designate a second logical unit device as a new primary logical unit device after removal of the primary logical unit device designation from the first logical unit device, the second logical unit device comprising a second physical memory disk, storing a second operating system comprising a cloned copy of the first respective operating system such that any modifications applied during operation of the first respective operating system are identically applied to the second operating system, and being a second type of memory device selected to have a different mirroring scheme than the first mirroring scheme and to have a different redundant array of independent disks (RAID) configuration than the first logical unit device, and
      maintain a first table for each of the first and second logical unit devices for tracking out-of-synch sectors on each respective logical unit device relative to sectors on the primary logical unit device, and maintain a second table indicating which of the first and the second logical unit devices is the primary logical unit device,
         wherein removing the primary logical unit device designation from the first logical unit device and designating the second logical unit device as the new primary logical unit device is transparent to the host computing device.

2. The system of claim 1, wherein at least two of the plurality of physical memory devices are a same type of memory device.

3. The system of claim 2, wherein one of the plurality of physical memory devices is one of a serial advanced technology attachment (SATA) device, an enterprise device, and a solid-state device.

4. The system of claim 1, wherein the first logical unit device is a serial advanced technology attachment (SATA) device and the second logical unit device is an enterprise device.

5. The system of claim 1, wherein the first logical unit device is a serial advanced technology attachment (SATA) device and the second logical unit device is a solid-state device.

6. The system of claim 1, wherein the first type of memory device is an enterprise device and the second type of memory device is a solid-state device.

7. The system of claim 1, wherein the plurality of physical memory devices comprises at least three memory devices storing a respective operating system.

8. The system of claim 1, wherein the sub-loader is configured to set each bit in the first table to indicate which sector needs to be synched when a response for input/output indicating that data is hardened on the primary logical unit device is received.

9. The system of claim 8, wherein the sub-loader is configured to implement an asynchronous process for synchronizing the first and the second logical unit devices.

10. The system of claim 9, wherein the sub-loader is further configured to reset the table once each sector is cloned.

11. A method for providing operating system redundancy in a computing system including a host computing device coupled to a first logical unit device comprising a first physical memory disk and including a first operating system and to a second logical unit device comprising a second physical memory disk and including a second operating system via a sub-loader such that the host computing device sees the first and second logical unit devices and the sub-loader as a single memory device, the first operating system and the second operating system being clones of one another such that any modifications applied during operation of the first operating system are identically applied to the second operating system, the method comprising:
   designating, by the sub-loader, the first logical unit device as a primary logical unit device, the first logical unit device being a first type of memory device and having a first mirroring scheme;
   determining, by the sub-loader, that the first logical unit device is unresponsive pursuant to failing to receive a response to perform a functional request after a predetermined threshold of time;
   removing, by the sub-loader, the designation of primary logical unit device from the first logical unit device;

designating, by the sub-loader, the second logical unit device as a new primary logical unit device after removal of the primary logical unit device designation from the first logical unit device, the second logical unit being a second type of memory device and selected to have a different mirroring scheme than the first mirroring scheme and to have a different redundant array of independent disks (RAID) configuration than the first logical unit device;

maintaining by the sub-loader a first table for each of the first and second logical unit devices for tracking out-of-synch sectors on each respective logical unit device relative to sectors on the primary logical unit device, and maintaining a second table indicating which of the first and the second logical unit devices is the primary logical unit device; and after designating the second logical device as the new primary logical unit device, attempting to bring the first logical unit device back in synch with the new primary logical unit device so that the first logical unit device is available, wherein removing the primary logical unit device designation from the first logical unit device and designating the second logical unit device as the new primary logical unit device is transparent to the host computing device.

12. The method of claim 11, wherein designating the first logical unit device as the primary logical unit device comprises designating the first logical unit device as the primary logical unit device based on the first type of memory device for the first logical unit device.

13. The method of claim 12, wherein the first type of memory device is one of a serial advanced technology attachment (SATA) device, an enterprise device, and a solid-state device.

14. The method of claim 11, wherein the second type of memory device is one of a SATA device, an enterprise device, and a solid-state device.

15. A computer program product for facilitating operating system redundancy, the computer program product comprising a non-transitory computer-readable storage medium having computer-readable program code portions stored therein, the computer-readable program code portions comprising:

a first executable portion for designating a first logical unit device as a primary logical unit device comprising a first physical memory disk and storing a first operating system, the first logical unit device being a first type of memory device;

a second executable portion for determining that the first logical unit device is unresponsive pursuant to failing to receive a response to perform a functional request after a predetermined threshold of time;

a third executable portion for removing the designation of primary logical unit device from the first logical unit device;

a fourth executable portion for designating a second logical unit device as a new primary logical unit device after removal of the primary logical unit device designation from the first logical unit device, the second logical unit device comprising a second physical memory disk and including a second operating system, the second operating system being a clone of the first operating system such that any modifications applied during operation of the first operating system are identically applied to the second operating system, and the second logical unit device being a second type of memory device and selected to have a different mirroring scheme than the first mirroring scheme and to have a different redundant array of independent disks (RAID) configuration than the first logical unit;

a fifth executable portion for maintaining a first table for each of the first and second logical unit devices for tracking out-of-synch sectors on each respective logical unit device relative to sectors on the primary logical unit device, and maintaining a second table indicating which of the first and the second logical unit devices is the primary logical unit device; and a sixth executable portion for, after designating the second logical device as the new primary logical unit device, attempting to bring the first logical unit device back in synch with the new primary logical unit device so that the first logical unit device is available, wherein removing the primary logical unit device designation from the first logical unit device and designating the second logical unit device as the new primary logical unit device is transparent to the host computing device.

16. The computer program product of claim 15, wherein the first executable portion comprises a first executable sub-portion for designating the first logical unit device as the primary logical unit device based on the first type of memory device for the first logical unit device.

17. The method of claim 16, wherein the first type of memory device is one of a serial advanced technology attachment (SATA) device, an enterprise device, and a solid-state device.

18. The computer program product of claim 17, wherein the fourth executable portion comprises a second executable sub-portion for designating the second logical unit device as the new primary logical unit device based on the second type of memory device for the second logical unit device, wherein the second type of memory device is one of a SATA device, an enterprise device, and a solid-state device.

* * * * *